United States Patent [19]

Kawahara et al.

[11] Patent Number: 5,267,026
[45] Date of Patent: Nov. 30, 1993

[54] VIDEO CAMERA WITH WHITE BALANCE CONTROL HAVING THE FUNCTION OF INHIBITING AUTO WHILE BALANCE CONTROL UNDER A SPECIAL LIGHT SOURCE OR OF A SPECIAL OBJECT

[75] Inventors: Hiroyuki Kawahara; Shingo Tatsumi, both of Kawasaki, Japan

[73] Assignee: Canon Kabushiki Kaisha, Tokyo, Japan

[21] Appl. No.: 752,029

[22] Filed: Aug. 29, 1991

[30] Foreign Application Priority Data

| Aug. 31, 1990 | [JP] | Japan | 2-228161 |
| Sep. 14, 1990 | [JP] | Japan | 2-242561 |
| Dec. 10, 1990 | [JP] | Japan | 2-401114 |
| Dec. 10, 1990 | [JP] | Japan | 2-401115 |

[51] Int. Cl.⁵ .................................. H04N 9/73
[52] U.S. Cl. ..................................... 358/29
[58] Field of Search ........................... 358/29, 29 C

[56] References Cited

U.S. PATENT DOCUMENTS

| 4,797,733 | 1/1989 | Takagi et al. | 358/29 C |
| 4,883,360 | 11/1989 | Kawada et al. | 358/29 C |
| 4,922,330 | 5/1990 | Saito et al. | 358/29 C |
| 4,954,884 | 9/1990 | Nakayama et al. | 358/29 C |
| 5,021,875 | 6/1991 | Iida et al. | 358/29 C |
| 5,038,205 | 8/1991 | Kondo et al. | 358/29 C |

*Primary Examiner*—Mark R. Powell
*Attorney, Agent, or Firm*—Morgan & Finnegan

[57] ABSTRACT

In a video camera capable of regulating the white balance by relative regulation of the gains of plural color signals obtained from the light coming from an object, a control signal for controlling the white balance regulating operation is formed according to color temperature information, and the formation of the control signal is suspended according to the result of discrimination whether the control signal is within a predetermined range, whereby the time required for regulating operation is shortened. Also in case the object color is identified to contain a deviation to a particular color, the control signal is replaced by another value. In this manner the white balance control utilizing the image signal is enabled ever under a special light source for a special object.

20 Claims, 12 Drawing Sheets

VIDEO CAMERA WITH WHITE BALANCE CONTROL HAVING THE FUNCTION OF INHIBITING AUTO WHILE BALANCE CONTROL UNDER A SPECIAL LIGHT SOURCE OR OF A SPECIAL OBJECT

BACKGROUND OF THE INVENTION

1. Field of the Invention

The present invention relates to a video camera, and more particularly to a video camera with automatic white balance control function.

2. Related Background Art

FIG. 1 is a block diagram showing principal parts of a video camera of the above-mentioned kind. Light 1 from an object enters, through a lens 2, the light-receiving part of an image pickup device 3, and is photoelectrically converted into electrical color signals of R' (red), G' (green) and B' (blue). Among the color signals from said image pickup device 3, the R' and B' signals are respectively amplified by variable-gain amplifiers 4a, 4c of a voltage control system for white balance control, while the G' signal is amplified by an ordinary amplifier 4b, and R, G and B color signals obtained by such color balance correction are supplied to a signal processing circuit 5. Said circuit 5 effects necessary signal processing, and sends a luminance signal Y and color difference signals R-Y, B-Y to an encoder circuit 6, which in response generates a composite color video signal.

On the other hand, said color difference signals R-Y, B-Y from the signal processing circuit 5 are also supplied, respectively through analog-to-digital (A/D) converters 7a, 7b, to a microprocessor 8 which effects white balance control based on thus entered color difference signals R-Y, B-Y. More specifically, white balance control signals are supplied, through digital-to-analog (D/A) converters 9a, 9b, to the variable-gain amplifiers 4a, 4c in such a manner that said R-Y and B-Y signals become "0". The white balance control is achieved by the control of the gains of said variable-gain amplifiers 4a, 4c.

Switch circuit 10 is connected to the microprocessor 8, and, when a switch 10a of said switch circuit 10 is turned on, the microprocessor 8 is activated to close the circuit of the white balance control system, thereby effecting white balance control.

FIG. 2 is a flow chart of a conventional white balance control sequence in the video camera of the above-explained structure.

When the white balance control operation is started by the closing of the switch 10a, a step S1 effects the initialization of the microprocessor 8 shown in FIG. 1, and a step S2 sets a timer in the microprocessor 8. Said timer is used for preventing prolonged continuation of the white balance control operation in case the white balance is not attained for some reason, but is set at a relatively long time. Then a step S3 discriminates whether the above-mentioned color difference signals R-Y, B-Y are "0". If said signals are "0", a white balanced state is identified to have been already reached and the white balance control operation is terminated. On the other hand, if said signals are not "0", a step S4 calculates an R control amount and a B control amount respectively for the variable-gain amplifiers 4a, 4c for the R and B signals, and a step S5 discriminates whether these control amounts (target control values) are within a predetermined white balance control range, namely within a control table stored in the microprocessor 8, and, if said control amounts are contained in the control table, a step S7 supplies the variable-gain amplifiers 4a, 4c with R and B control signals corresponding to thus calculated control amounts. However, if the step S5 identifies that the target control values are not contained in the control table, a step S6 substitutes the R and B control values with limit values of the control table closest to said target control values, and the step S7 releases R and B control signals corresponding to thus substituted control value. Then a step S8 discriminates whether the set time of said timer has expired, and, if not, the sequence returns to the step S3 to repeat the sequence thereafter, but, if expired, the R and B control signals at this point are released and the white balance control operation is terminated.

FIG. 3 shows an example of the white balance control range mentioned above, wherein an area surrounded by a solid line (i) corresponds to the above-mentioned table. A broken line (ii) in said table (i) indicates the trajectory of white balance attained with a black body radiation light source, and the position of the white balance varies according to the color temperature of said light source. The table (i) is wider than said trajectory (ii) corresponding to the light of black body radiation, in order to attain the white balance also for artificial light sources such as a fluorescent lamp. However the width of said table (i) is limited to a practically acceptable value since, if it is too wide, the color vanishes when the white balance is obtained on a monotonously colored object.

However, in such conventional white balance control device, if the white balance control is conducted under a light source outside the color temperature range corresponding to the black body radiation or a special artificial light source, or on an object with a large area of single color, the color difference signals cannot be reduced to zero at the same time because the control signals cannot be varied beyond the limit value of said table. Consequently the white balance control operation is continued until the set time of said timer expires, and requires a longer time than in the white balance determining operation.

More specifically, if the control position at the start of white balance control operation is at a point A in the table (i) shown in FIG. 4 and the target control position is at B outside the table (i), the control operation stops when the control value reaches a boundary point C of the table (i) closest to the target control position, and the white balance control operation is thereafter continued until the set time of the timer expires, though the control value no longer varies.

Also as the above-explained conventional structure is based on the white balance control of so-called TTL system employing the video signal obtained from the object through the image pickup device as the control data for the white balance control operation, such operation becomes impossible in principle for a special object, for example an entirely red object. This is because the average of the image signal obtained from such object in a field period is not gray.

As a specific example, if the automatic white balance control operation is conducted while a red paper is caught over the entire image frame, the signal processing circuit 6 tries to reproduce the red object as a gray image, whereby the color of the image displayed on the monitor becomes drastically different from the read color actually observed by the user.

In order to overcome such drawback there can be utilized for example an external light metering sensor system, but the use of such external sensor system complicates the structure and the handling and elevates the cost of the apparatus.

SUMMARY OF THE INVENTION

In consideration of the foregoing, an object of the present invention is to provide a video camera capable of automatic white balance control operation even in the phototaking operation under a special light source or of a special object.

Another object of the present invention is to provide a video camera capable of completing the white balance control operation within a short time, even in the phototaking operation under a special light source or of a special object.

The above-mentioned objects can be attained, according to an embodiment of the present invention, by a video camera comprising:

image pickup means for forming plural color signals according to the light coming from the object;
  regulation means for regulating the relative gains of said plural color signals, thereby regulating the white balance thereof;
  control signal forming means for forming a control signal for controlling said regulation means, according to color temperature information;
  discrimination means for discriminating whether said control signal within a predetermined range; and
  termination means for terminating the function of said control signal forming means, according to the result of discrimination by said discrimination means.

Still another object of the present invention is to provide a video camera capable of white balance control operation according to an image pickup signal, even in the phototaking operation under a special light source or of a special object.

The above-mentioned object can be attained, according to another embodiment of the present invention, by a video camera comprising:

image pickup means for forming plural color signals according to the light coming from an object;
  regulation means for regulating the relative gains of said plural color signals, thereby regulating the white balance thereof;
  control signal forming means for forming a control signal for controlling said regulation means, according to color temperature information;
  detection means for detecting that the color of said object is biased to a particular color; and
  substitution means for substituting the value of the control signal formed by said control signal forming means with another value, according to the result of detection by said detection means.

Still other objects of the present invention, and the features thereof, will become fully apparent from the following description of the embodiments of the present invention, to be taken in conjunction with the attached drawings.

DETAILED DESCRIPTION OF THE PREFERRED EMBODIMENTS

Figure 1:
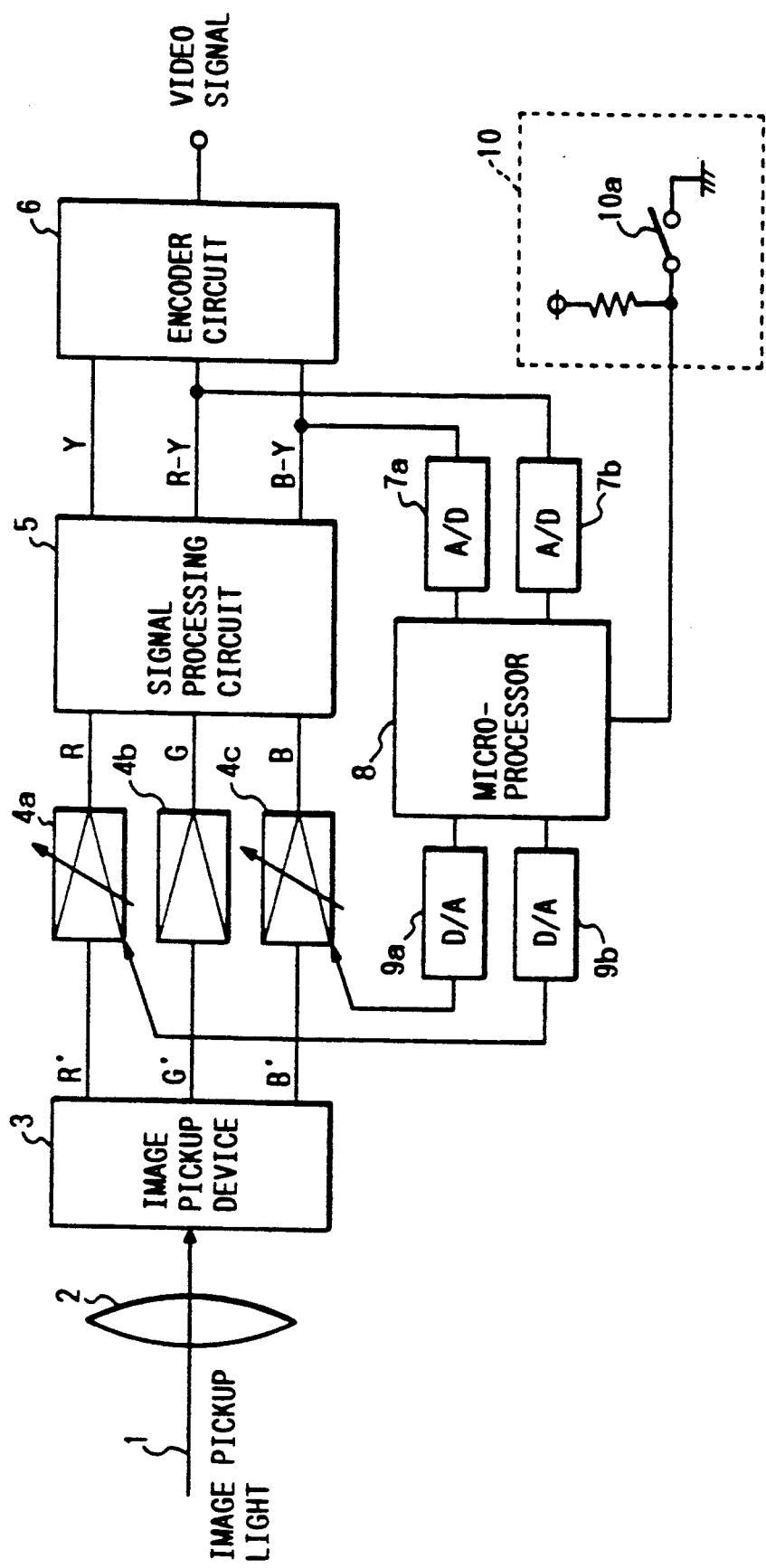
FIG. 1 is a schematic block diagram of a conventional video camera.
Figure 5:
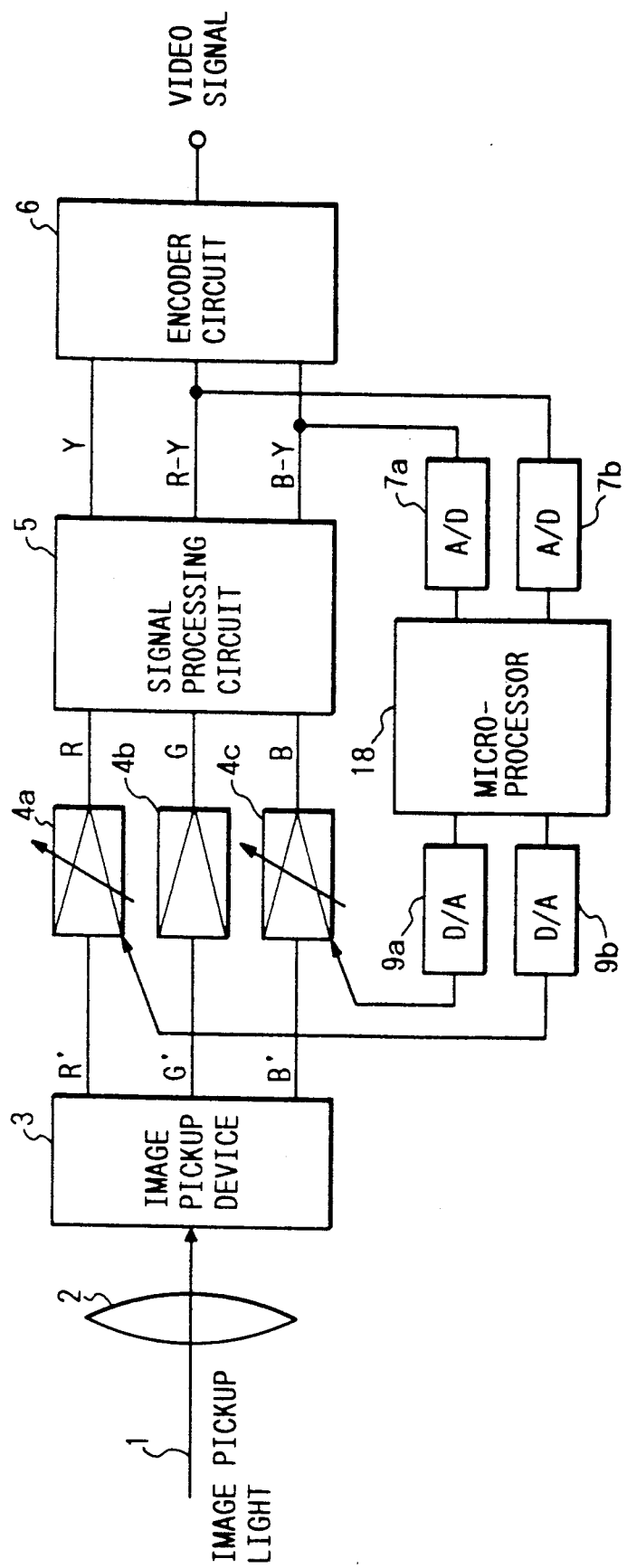
FIG. 5 is a schematic block diagram of a video camera constituting an embodiment of the present invention.

FIG. 5 is a schematic block diagram of a video camera constituting an embodiment of the present invention, wherein equivalent components to those in FIG. 1 are represented by same numbers.

Figure 2:
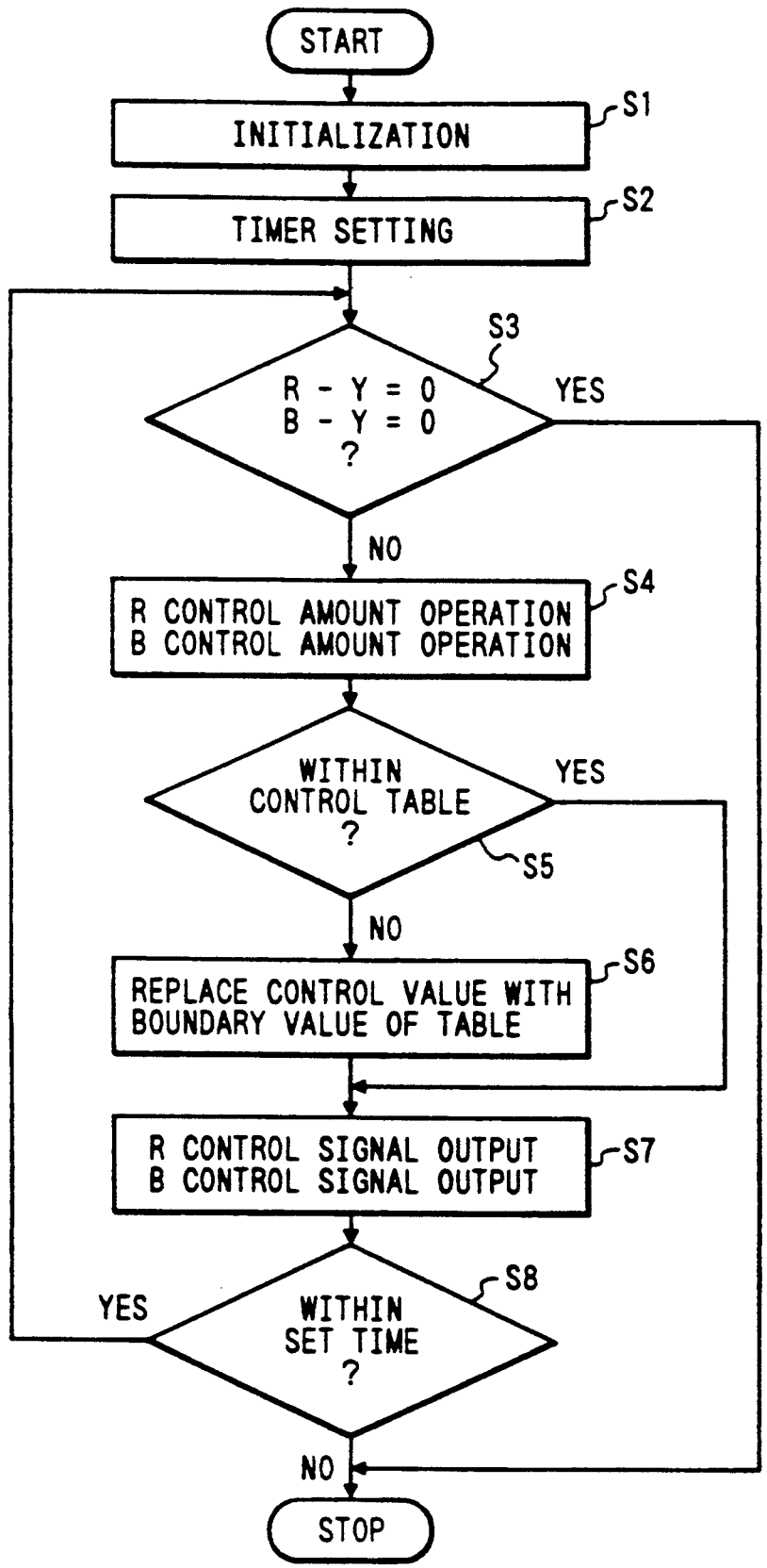
FIG. 2 is a flow chart of a white balance control operation in the video camera shown in FIG. 1.
Figure 6:
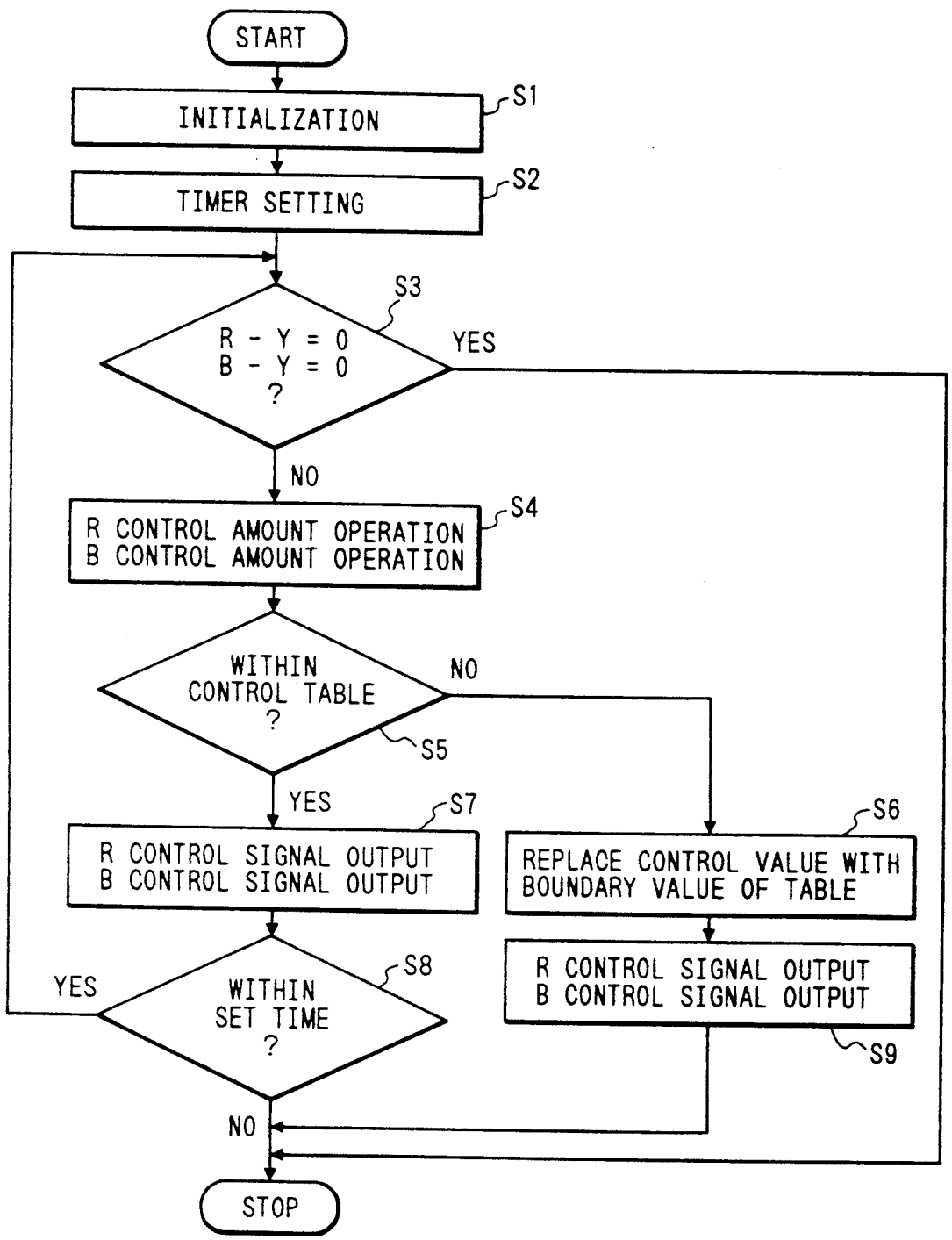
FIG. 6 is a flow chart of a white balance control sequence in the video camera shown in FIG. 5.

The video camera shown in FIG. 5 is different from that in FIG. 1, principally in the function of the microprocessor 18, and said function will be explained in the following with reference to a flow chart shown in FIG. 6, wherein similar steps to those in FIG. 2 are represented by same step numbers.

Figure 4:
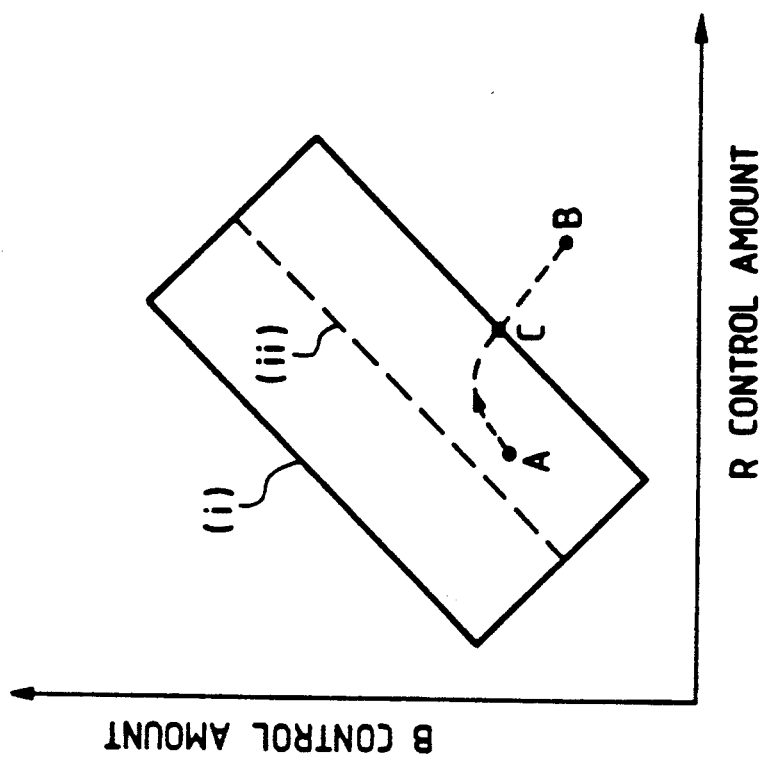
FIG. 4 is a chart for explaining the amount of white balance control in the video camera shown in FIG. 1.
Figure 3:
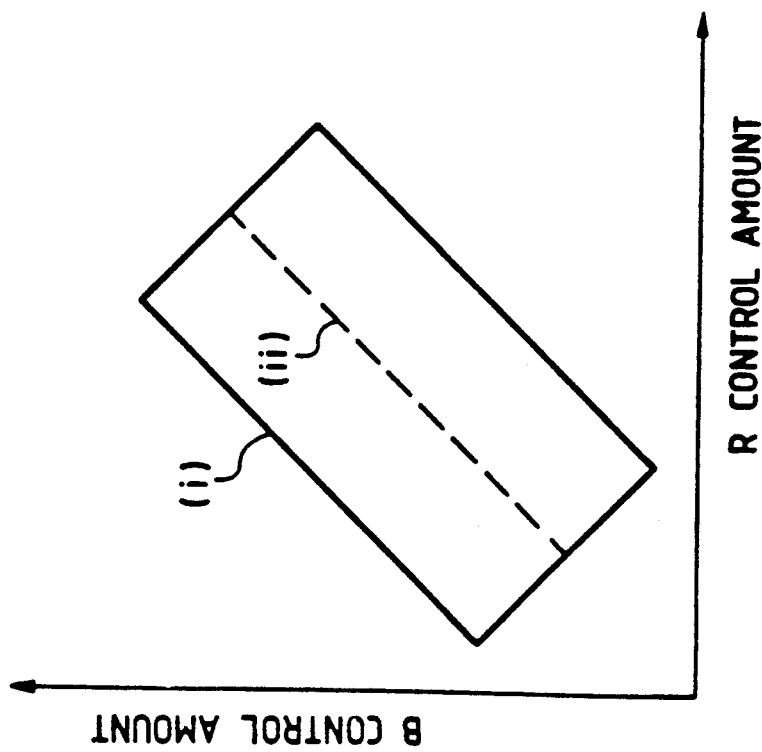
FIG. 3 is a chart showing an example of white balance control range in the video camera shown in FIG. 1.

The microprocessor 18 stores a table (i) shown in FIG. 4, for limiting the white balance control range. Said microprocessor 18 is adapted, when the target control value of white balance is positioned outside said control range, to terminate the white balance control operation by selecting, as the white balance control value, a boundary value of said control range closest to said target control value.

Now the white balance control sequence will be explained in detail with reference to FIG. 6.

When said sequence is initiated, a step S1 initializes the microprocessor 18, and a step S2 sets the aforementioned timer.

Then, in a step S3, the microprocessor 18 discriminates whether the color difference signals R-Y, B-Y entered from the signal processing circuit 5 are "0", and terminates the white balance control operation if said signals are "0", indicating that the white balance is already attained.

If said signals are not "0" in the step S3, a step S4 calculates the aforementioned R and B control amounts for the variable-gain amplifiers 4a, 4c. Then a step S5 discriminates whether the obtained target control value is within the aforementioned control table, and, if it is within the control table, a step S7 supplies the variable-gain amplifiers 4a, 4c with R and B control signals based on said target control value. Then a step S8 discriminates whether the set time of the timer has expired, and, if not, the above-explained sequence is repeated, but, if expired, the control sequence is terminated.

If the step S5 identifies that the target control value is not within the control table, namely that said target control value is outside the white balance control range, the sequence proceeds to a step S6 for substituting the control value with a boundary value of said control table, namely a boundary value of the white balance control range, closest to the target control value. Then a step S9 supplies the variable-gain amplifiers 4a, 4c with R and B control signals based on thus substituted control value, and the white balance control operation is terminated.

As explained in the foregoing, if the target control value of white balance is positioned outside the control range, the control operation is terminated by selecting a boundary value of the white balance control range closest to said target control value as the control value, so that the control time does not become unnecessarily long even under a special light source and the ease of use is therefore improved.

The present embodiment, designed to terminate the white balance control operation by selecting a boundary value of the white balance control range closest to the target control value as the control value if said target control value is positioned outside said control range, provides an advantage of not prolonging the white balance control time even under a light source where the target control value is positioned outside the white balance control range, thereby improving the convenience of use.

Figure 7:
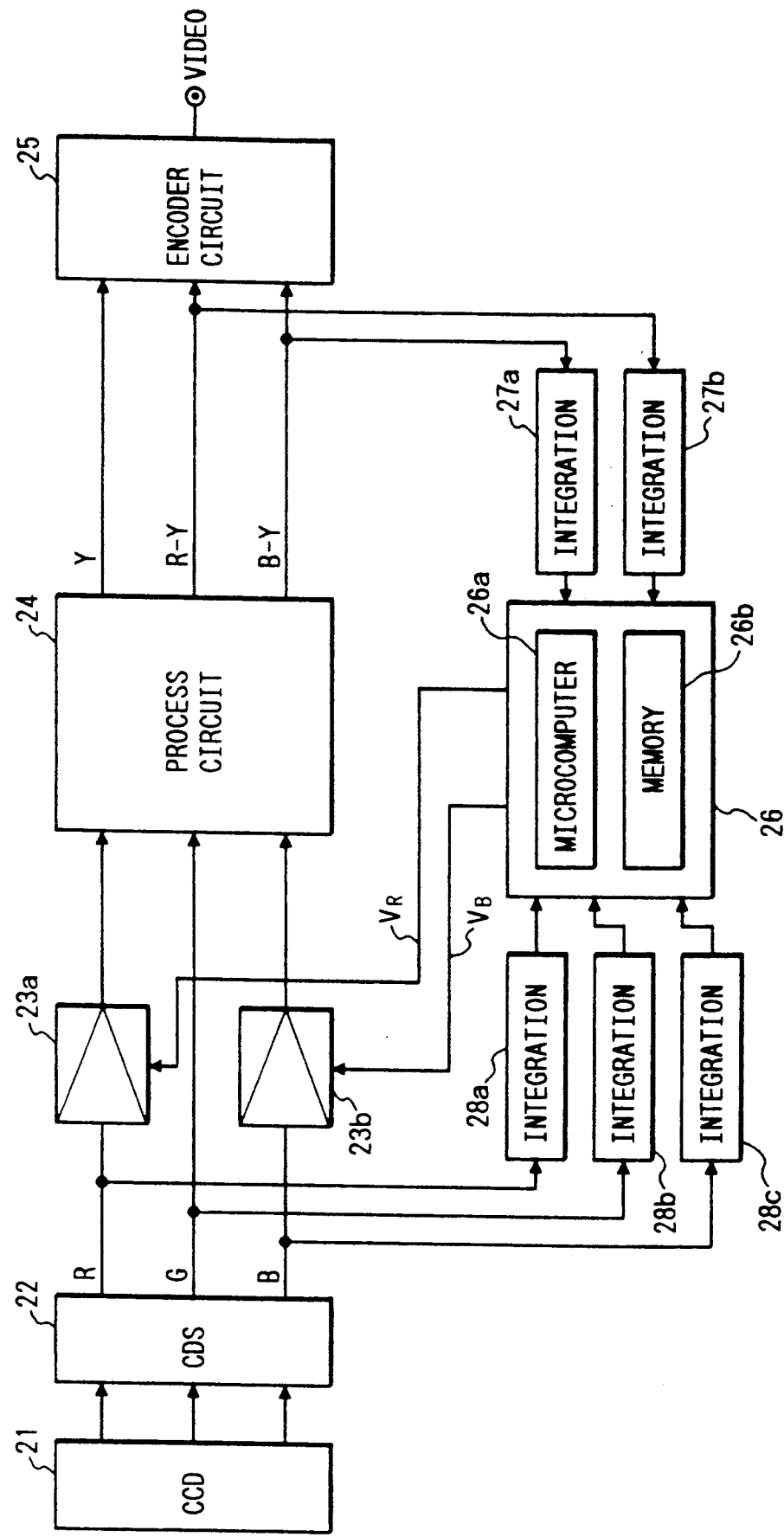
FIG. 7 is a schematic block diagram of a video camera constituting another embodiment of the present invention.

FIG. 7 is a schematic block diagram of a video camera constituting another embodiment of the present invention, wherein provided are a CCD 21 for photoelectric conversion of the object image; a CDS circuit 22 for eliminating clocking noises from the signals obtained from said CCD 21; gain-control amplifiers 23a, 23b of which gains are controlled by control signals from a control unit 26 and which controls the output levels of the R and B color signals thereby regulating the white level; a process circuit 24 for receiving R, G and B color signals and generating a luminance signal Y and color difference signals R-Y, B-Y; an encoder circuit 25 for generating a composition video signal from said luminance signal Y and color difference signals R-Y, B-Y; a control unit 26 equipped with a microcomputer 26a and a memory 26b; color difference signal integrating circuits 27a, 27b for respectively integrating the color difference signals R-Y, B-Y for predetermined periods; and color signal integrating circuits 28a, 28b, 28c for respectively integrating the R, G and B color signals released from the CDS circuit 22 and prior to the entry into the gain-control amplifiers 23a, 23b, for predetermined periods. Said predetermined period is a period capable of generating an output that can represent the average color of the object but is shorter than a field period.

In the following there will be explained the function of the above-explained embodiment.

The electrical image signal obtained by photoelectric conversion in the CCD 21 is subjected in the CDS circuit 22 to double-correlation sampling to obtain R, G and B color signals free from clocking noises. The R and B color signals are supplied through the gain-control amplifiers 23a, 23b while the G color signal is supplied directly, to the process circuit 24, and these color signals are converted into the luminance signal Y and the color difference signals R-Y and B-Y, which are further converted in the encoder circuit 25 into the composite video signal.

In the white balance control system, the color difference signals R-Y, B-Y released from the process circuit 24 are respectively integrated in the integration circuits 27a, 27b at least for a predetermined period, and the results of said integrations are supplied to the control unit 26. Based on the input data, the control unit 26 supplies the gain-control amplifiers 23a, 23b with control signals $V_R$, $V_B$ for varying the gains of said amplifiers thereby varying the amounts of R and B color signals, so as to reduce the difference between the integrated values of the color difference signals R-Y, B-Y. Thus the white balance control is achieved in such a manner that the average of the image signal for at least the predetermined period becomes gray.

Also the R, G and B color signals prior to the gain control are respectively integrated in the integration circuits 28a, 28b, 28c at least for the predetermined period, and the results of said integrations are supplied to the control unit 26, which judges the deviation in the color of the object, from thus entered data. For example, if the object is red over the entire area, the integrated R color signal becomes significantly larger than the integrated B and G color signals, whereby the control unit 26 can identify that the color of the object in the monitor is significantly deviated toward red. In such case the control unit 26 suspends the ordinary white balance control through the control of the gain-control amplifiers 23a, 23b for varying the output levels of the R and B color signals based on the integrated values of the color difference signals by the integration circuits 27a, 27b, and instead effects white balance control by supplying the gain-control amplifiers 23a, 23b with control signals, stored in advance in the memory 26b, corresponding to an object under a particular light source.

Figure 8:
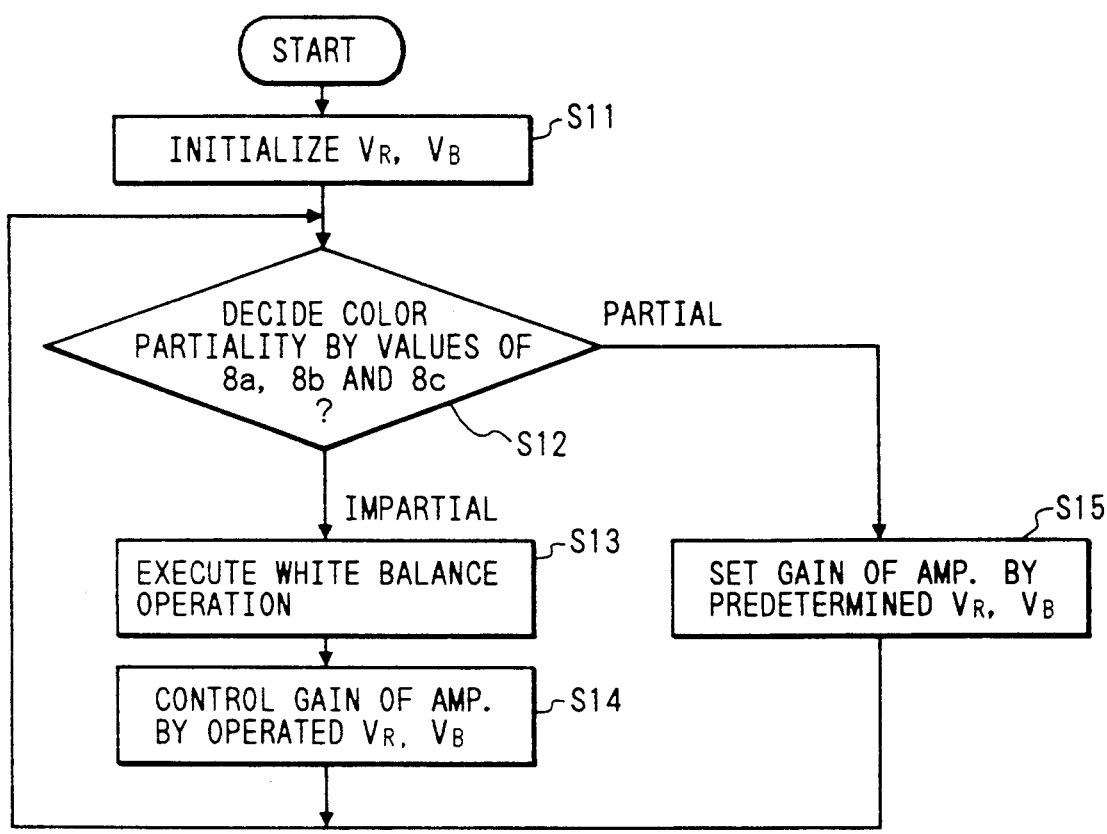
FIG. 8 is a flow chart of a white balance control sequence in the video camera shown in FIG. 7.

In the following there will be explained in detail the above-mentioned white balance control operation, with reference to a flow chart shown in FIG. 8.

At first a step S11 sets the control signals $V_R$, $V_B$ at initial values, and a step S12 discriminates the deviation in color, based on the integrated values, in the integration circuits 28a, 28b, 28c, of the color signals prior to gain control. If the deviation in color is absent, a step S13 calculates the white balance, and a step S14 effects the white balance control by supplying the gain-control amplifiers 23a, 23b with control signals $V_R$, $V_B$ obtained by said calculation.

On the other hand, if the step S12 identifies the presence of a deviation in color, the sequence proceeds to a step S15 for supplying the gain-control amplifiers 23a, 23b with control signals $V_R$, $V_B$ which are predetermined and stored in advance in the memory 26b, whereupon the white balance control operation is terminated.

Thus, by setting the control values for the gain-control amplifiers 23a, 23b at values stored in advance corresponding to the light source, there is achieved the automatic white balance control function of TTL method, in which a red object can be reproduced as red.

The predetermined values corresponding to the light source mean the control values $V_R$, $V_B$ for the gain-control amplifiers 23a, 23b which reproduce a color, that is generally accepted as white, as white under such light source, and such values are predetermined for a situation in which the mode of use of the video camera is easily predicted. An example of such case is an electronic overhead projector in which the video camera is used in combination with a particular light source for illuminating an original stage.

The integrating period of the color difference signal integration circuits 27a, 27b and the color signal integration circuits 28a, 28b, 28c is not limited to a field period or shorter, but can be selected as two field periods or longer, and, in such case, stabler white balance control can be attained though the response becomes slower.

As explained in the foregoing, in the embodiment shown in FIG. 7, the optical image of object is photoelectrically converted by a solid-state image pickup device into plural color signals, which are controlled by the gain-control amplifiers to effect white balance control and are supplied to the process circuit to generate the luminance signal and plural color-difference signals.

The color difference signals are integrated in the plural integration circuits at least for a predetermined period and then supplied to the control unit for obtaining the control signals for controlling the gains of the gain-control amplifiers.

Furthermore the color signals prior to the entry to the gain-control amplifiers are integrated by the color signal integration circuits at least for a predetermined period and then are supplied to the control unit. If the object color is identified to contain significant deviation based on the integrated outputs of the color signal integration circuits, the control unit executes, instead of the white balance control based on the integrated outputs of the color difference signals, the white balance control operation by controlling the gains of said gain-control amplifiers with the pre-stored control signals corresponding to a particular light source. Thus satisfactory white balance control can be attained without addition of a sensor system such as an external light metering system, even on an image consisting for example of red color only, which is difficult to deal with by the conventional automatic white balance control of the TTL system.

Particularly in a video camera combined with an illuminating light source, such as that utilized in an electronic overhead projector, the feature of the present invention can be fully exploited since the light source can be easily predicted.

Figure 9:
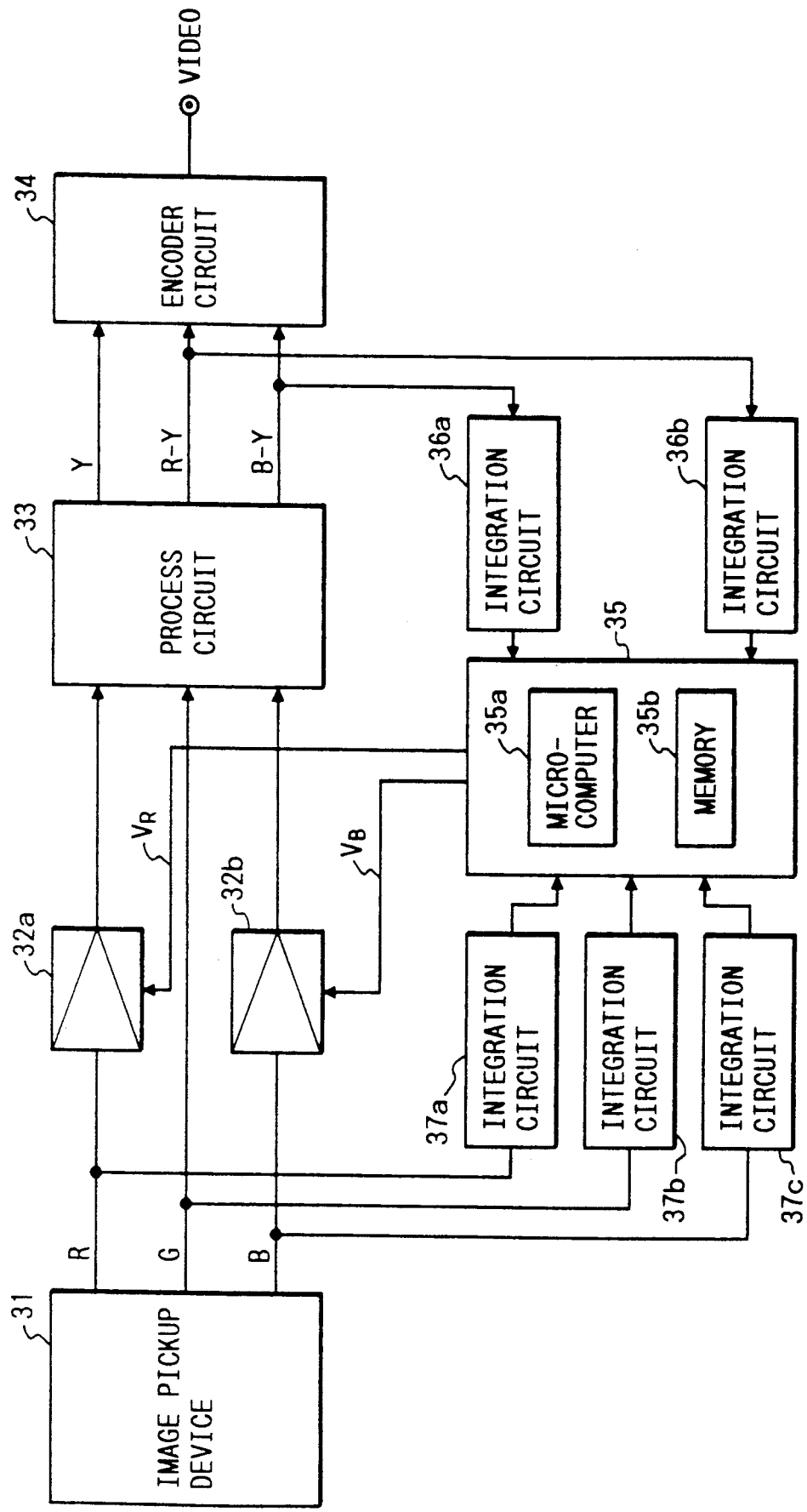
FIG. 9 is a schematic block diagram of a video camera constituting still another embodiment of the present invention.
Figure 10:
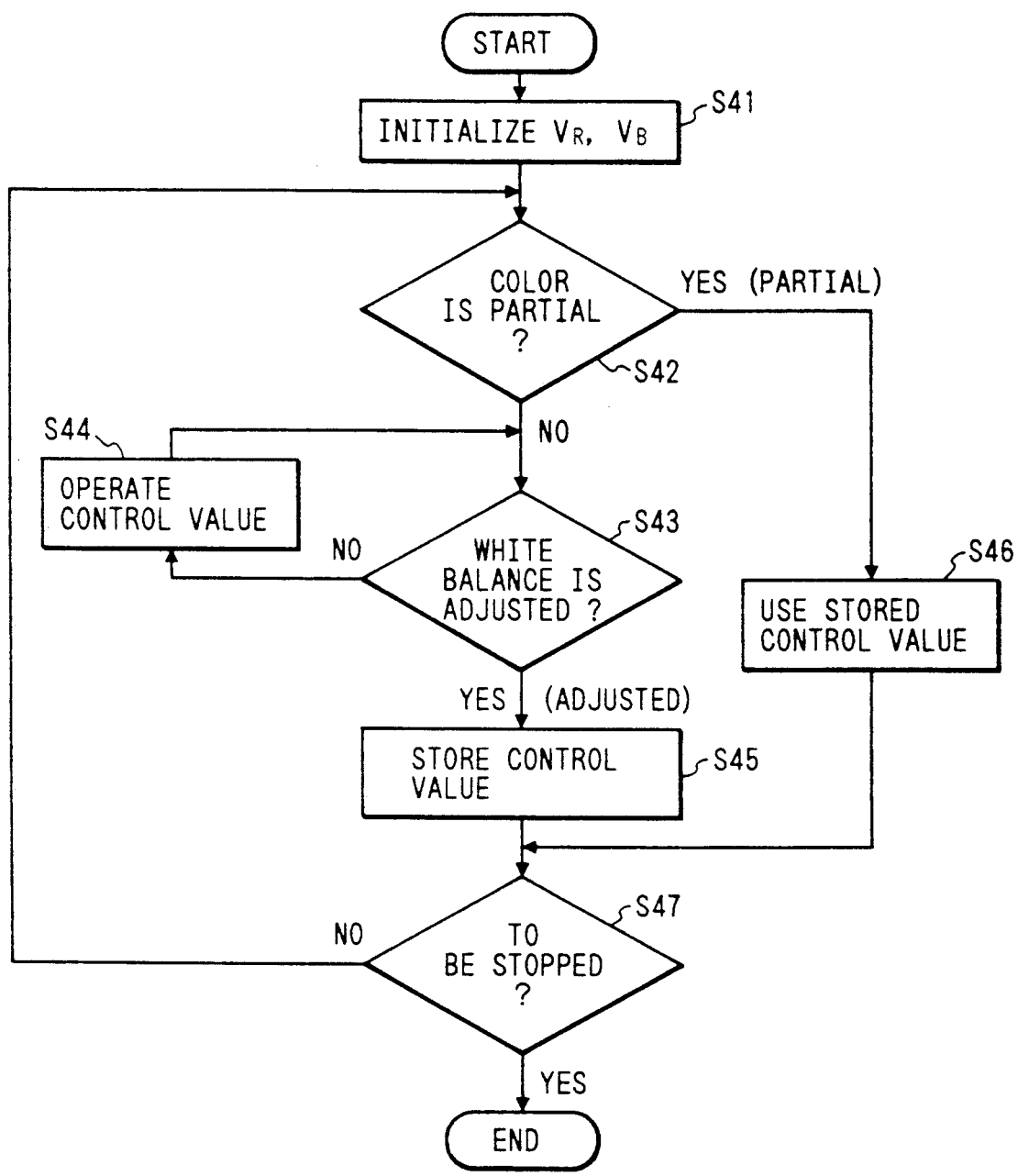
FIG. 10 is a flow chart of a white balance control sequence in the video camera shown in FIG. 9.

FIG. 9 is a schematic block diagram of a video camera constituting still another embodiment of the present invention, and FIG. 10 is a flow chart showing the control sequence of said embodiment.

Referring to FIG. 9, an image pickup device 11 converts the optical image of an object (not shown) into plural electrical color signals. Integration circuits 36a, 36b integrate color difference signals, supplied from a process circuit 36, for a predetermined period. Integration circuits 37a, 37b, 37c respectively integrate color signals R, G, B, before the entry into gain-control amplifiers 32a, 32b, for a predetermined period. A control unit 35, equipped with a microcomputer 35a and a memory 35b, receives the integrated values from the color difference signal integration circuits 36a, 36b and releases control signals for controlling the gains of the variable-gain amplifiers 32a, 32b, thereby obtaining appropriate white balance through an ordinary white balance control operation and memorizing said control values in this state.

The control unit 35, if identifying a significant deviation in the color of the object based on the outputs of the color signal integration circuits 37a, 37b, 37c, suspends the ordinary white balance control operation and controls the white balance by releasing control signals based on the control values stored in the memory 35b in advance.

The variable-gain amplifiers 32a, 32b are subjected to gain control by the control signals from the control unit 35, thereby controlling the output levels of the R and B color signals and thus achieving the white balance control. A process circuit 33 receives the R, G and B color signals and generates a luminance signal Y and color difference signals R-Y, B-Y. An encoder circuit 34 receives said luminance signal Y and color difference signals R-Y, B-Y and generates a composite video signal. The color difference signal integration circuits 36a, 36b respectively integrate the color difference signals R-Y, B-Y for a predetermined period (for example a field period), and the color signal integration circuits 37a, 37b, 37c respectively integrate, for a predetermined period (for example a field period), the R, G and B color signals which are released from the image pickup device 31 but before the entry into the variable-gain amplifiers 32a, 32b.

The function of the embodiment shown in FIG. 9 will be explained in the following, with reference to a flow chart shown in FIG. 10.

The optical image is photoelectrically converted in the image pickup device 31, shown in FIG. 9, into R, G and B color signals, which are supplied through the variable-gain amplifiers 32a, 32b to the process circuit 33 and are converted therein into the luminance signal Y and the color difference signals R-Y, B-Y. These signals are further converted by the encoder circuit 34 into the composite video signal.

The white balance control system sets the control values at initial values at the start of operation (step S41 in FIG. 10). Then the color difference signals R-Y, B-Y released from the process circuit 33 are respectively integrated by the color difference signal integration circuits 36a, 36b for a predetermined period (for example a field period) and then are supplied to the control unit 35. Based on thus entered data, the control unit 35 supplies the variable-gain amplifiers 32a, 32b with the control signals $V_R$, $V_B$ for varying the gains thereof thereby varying the amounts of R and B signals, thus effects a control operation so as to reduce the difference between the integrated values of the color difference signals R-Y and B-Y (step S44). Thus the white balance is obtained by a control to bring the average of the image signal in said predetermined period (for example a field period) to gray. When appropriate white balance is identified to have been obtained (step S43), the control values in this state are stored (step S45).

Also the R, G and B signals before the gain control are integrated respectively by the integration circuits 37a, 37b, 37c for a predetermined period and then are supplied to the control unit 35, which identifies the deviation in the object color, based on thus entered data (step S42).

For example, if the object is red over the entire area, the integrated R signal becomes significantly stronger than the integrated G and B signals, and the control unit 35 can identify that the color of the displayed object is significantly deviated toward red. In such case, the control unit 35 suspends the ordinary white balance control operation by varying the output levels of the R and B color signals through the control of the variable-gain amplifiers 32a, 32b based on the integrated color difference signals by the integration circuits 36a, 36b, and supplies the variable-gain amplifiers 32a, 32b with control signals $V_R$, $V_B$ based on the control values stored when appropriate white balance was obtained in a preceding white balance control operation (for example a control operation conducted at the start of operation of the apparatus or an immediately preceding control operation), thereby terminating the white balance control (step S46).

The above-explained sequence enables to obtain appropriate white balance which reproduces a red object in red color, even when the object is composed of red color only.

As explained in the foregoing, the embodiment shown in FIG. 9 provides a video camera capable of satisfactory white balance control without addition of a sensor system such as an external light metering system, even in an image consisting for example of red color only, which is difficult to deal with in the conventional TTL system.

Figure 12:
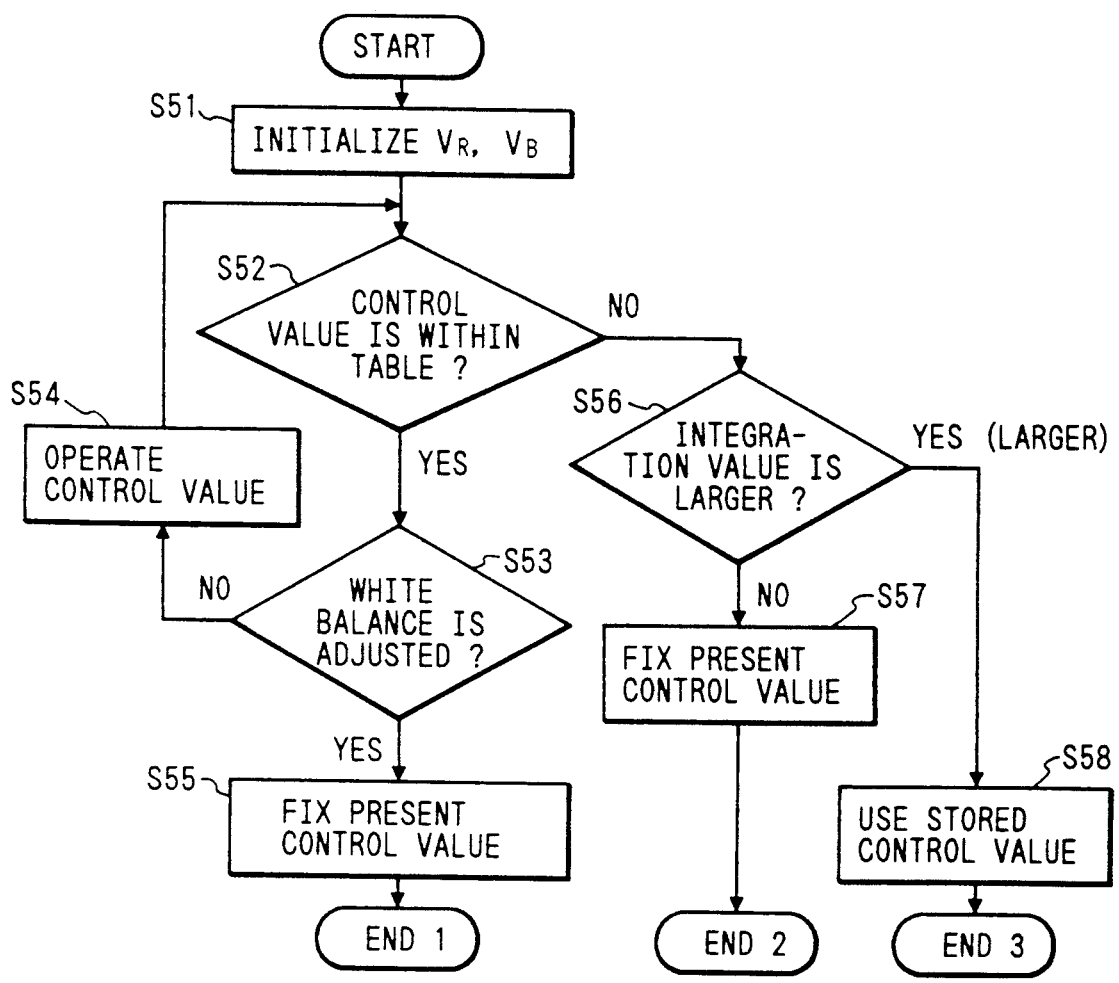
FIG. 12 is a flow chart of a white balance control sequence in the video camera shown in FIG. 11.
Figure 13:
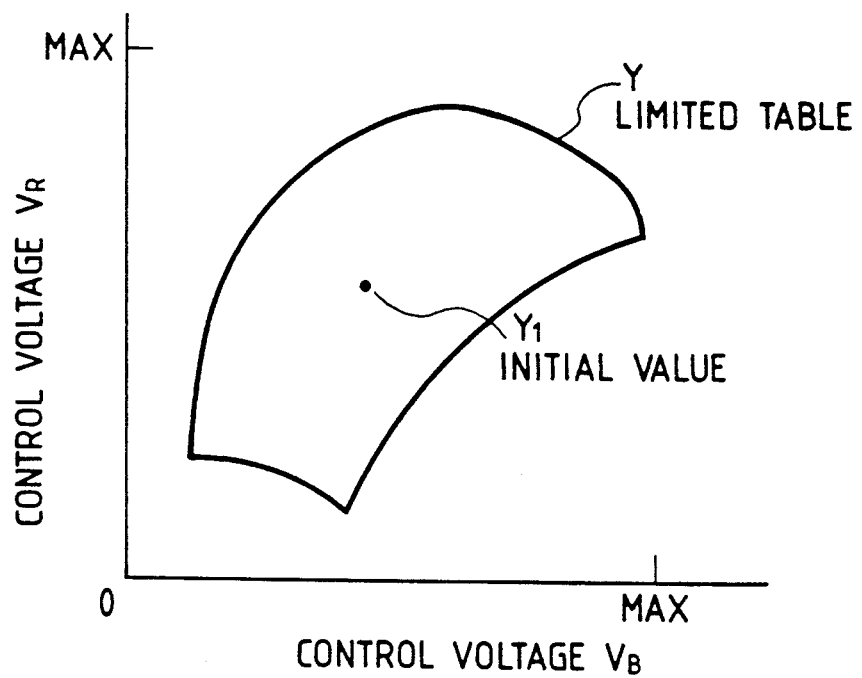
FIG. 13 is a chart showing a control table employed in the video camera shown in FIG. 11.

In the following there will be explained still another embodiment of the present invention with reference to FIG. 11 which is a schematic block diagram of a video camera constituting said embodiment, FIG. 12 which is a flow chart showing the control sequence of said embodiment, and FIG. 13 showing a control table employed in said embodiment.

Figure 11:
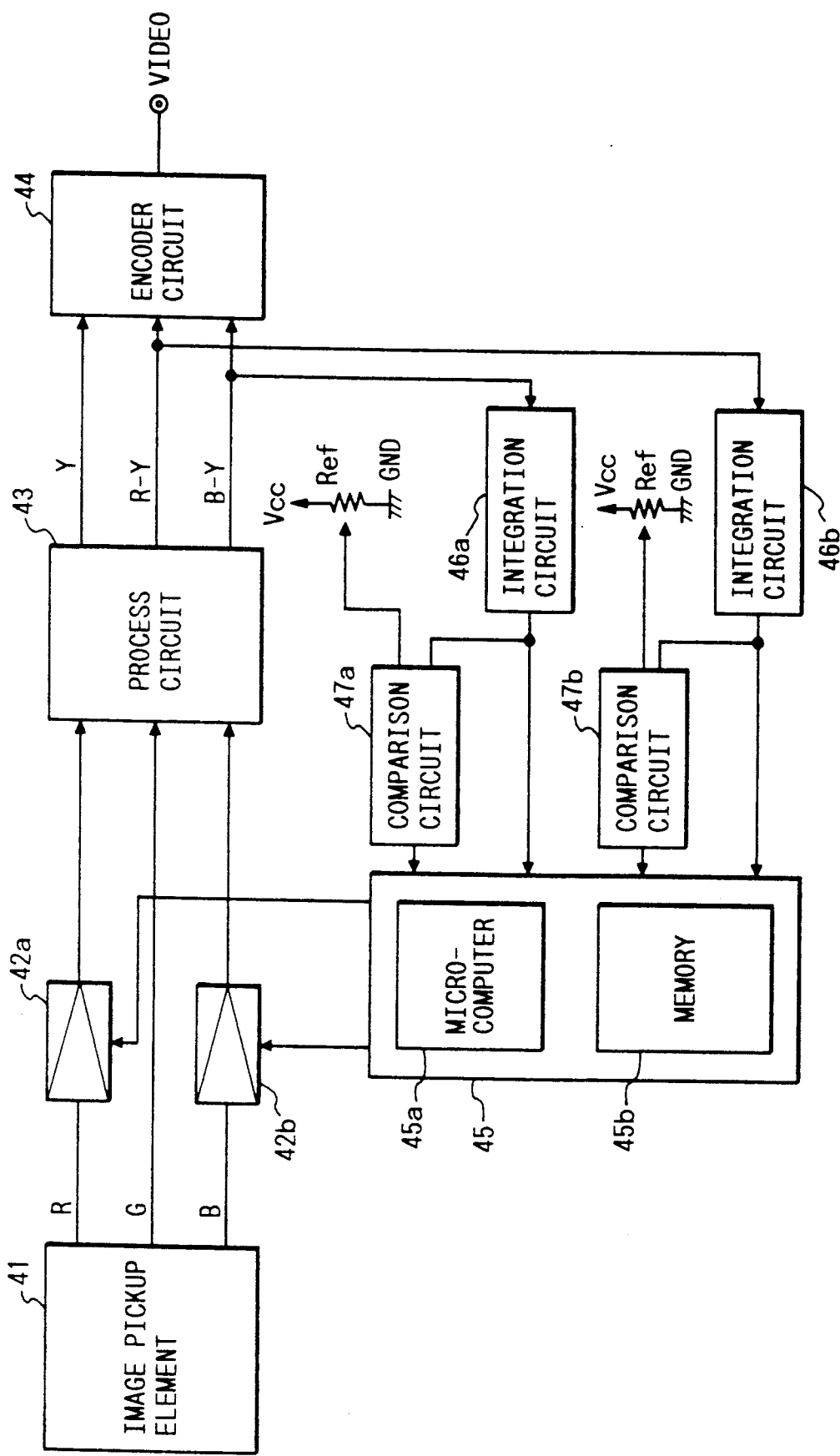
FIG. 11 is a schematic block diagram of a video camera constituting still another embodiment of the present invention.

Referring to FIG. 11, there are shown an image pickup device 41 for converting the optical image of an object (not shown) into plural electrical color signals; integration circuits 46a, 46b for integrating color difference signals from a process circuit 43 for a predetermined period; comparator circuits 37a, 37b for comparing the outputs of the color difference signal integration circuits 46a, 46b with predetermined values; and a control unit 45 for receiving the integrated outputs from the color difference signal integration circuit 46a, 46b and releasing control signals for controlling the gains of gain-control amplifiers 42a, 42b thereby effecting ordinary white balance control. The control unit 45 limits said control signals by a predetermined control table (FIG. 13), immediately suspends the white balance control operation when the control signals reach the limit of said control table, then compares the integrated values of the color difference signals with predetermined values, and, upon identifying a significant deviation in the color of the object based on the result of said comparison, releases control signals stored in advance corresponding to a particular light source.

The gain-control amplifiers 42a, 42b are subjected to gain control by the control signals from the control unit 45, and effect white balance control by varying the output levels of the R and B color signals. A process circuit 43 receives R, G and B color signals and generates a luminance signal Y and color difference signals R-Y, B-Y. An encoder circuit 44 receives the luminance signal Y and the color difference signals R-Y, B-Y to generate a composite video signal. Color difference signal integration circuits 36a, 36b respectively integrate the color difference signals R-Y, B-Y for a predetermined period (for example a field period), and comparator circuits 37a, 37b respectively compare the outputs of said color difference signal integration circuits with predetermined values. In FIG. 13, Y indicates the limited range of the control values, and Y1 indicates an initial value.

The function of the embodiment shown in FIG. 11 will be explained in the following with reference to a flow chart shown in FIG. 12.

An optical image is photoelectrically converted in the image pickup device 41 into R, G and B color signals, which are supplied through plural gain-control amplifiers 42a, 42b to the process circuit 43, in which said color signals are converted into the luminance signal Y and the color difference signals R-Y, B-Y. These signals are further converted by the encoder circuit 44 into the composite video signal.

In the white balance control system, at first the control values are set at initial values at the start of operation (step S51 in FIG. 12). Then the color difference signals R-Y, B-Y released from the process circuit 43 are integrated respectively by the color difference signal integration circuits 46a, 46b for a predetermined period (for example a field period), and the results of integration are supplied to the control unit 45. Based on the entered data the control unit 45 supplies the gain-control amplifiers 42a, 42b with control signals $V_R$, $V_B$ for varying the gains thereof, thereby regulating the amounts of R and B signals so as to reduce the difference between the integrated color difference signals R-Y and B-Y (step S54). Thus white balance control is achieved by bringing the average of the image signal in the predetermined period (for example a field period) to gray. When suitable white balance is identified to have been obtained (step S53), the control operation is terminated with thus obtained control values (step S55).

In case of the automatic white balance control of TTL system, if the above-explained control operation is continued without limitation on an object consisting for example red color only, the gains of the gain-control amplifiers 42a, 42b are forcedly controlled to provide gray color, so that the image reproduced by the video signal is significantly different from the actual color. For this reason, the values of the control signals are controlled by a control table (FIG. 13), and, if the values of the control signals are identified to have reached the limit of the control table Y in the course of the automatic white balance control operation (Step S52), there is immediately suspended the white balance control operation based on the integrated values of the color difference signals, and the gains of said gain-control amplifiers 42a, 42b are fixed at the control values at such suspension, whereby prevented is the drawback resulting form unnatural control of white balance (step S57).

Also the outputs of the integration circuits 46a, 46b at this point are compared with predetermined reference values in the comparator circuits 47a, 47b (step S56). If the object containing significant deviation in color, at the suspension of the white balance control operation by the limitation of the control table Y, the integrated color difference signals are not yet small enough, so that the color does not reach gray yet. Thus the control unit 45 can identify presence of a significant deviation in color, if the integrated color difference signals are larger than said reference values. If the control unit 45 identifies such deviation in color, it effects the white balance control by releasing pre-stored control signals, corresponding to a particular light source (step S58). In this manner there can be obtained automatic white balance control of TTL system, that can provide appropriate white balance according to the object, even in the presence of significant deviation in color.

Particularly in the video camera employed in an electronic overhead projector combined with an illumination light source, the feature of the present embodiment can be fully exploited as the light source can be easily estimated.

As explained in the foregoing, the embodiment shown in FIGS. 11 to 13 can provide a video camera capable of satisfactory white balance control without addition of a sensor system such as an external light metering system, even on an object consisting for example of red color only, which is difficult to deal with by the conventional TTL white balance control system.

What is claimed is:

1. A video camera, comprising:
   a) image pickup means for forming plural color signals according to the light from an object;
   b) regulation means for relative regulation of the gains of said plural color signals thereby regulating the white balance thereof;
   c) control signal forming means for forming, according to color temperature information, a control signal for controlling said regulation means;
   d) discrimination means for discriminating, whether said control signal is within a predetermined range; and
   e) termination means for stopping the function of said control signal forming means in response to the result of discrimination by said discrimination means, and for subsequently inhibiting the function of said control signal forming means irrespective of said control signal.

2. A video camera according to claim 1, further comprising:
   substitution means for substituting the value of the control signal, formed by said control signal forming means, with another value according to the result of discrimination by said discrimination means.

3. A video camera according to claim 2, wherein said substitution means is adapted to substitute the value of control signal, formed by said forming means, with a value within said predetermined range and close to the value of said control signal, according to the result of discrimination by said discrimination means.

4. A video camera according to claim 2, wherein said substitution means is adapted to substitute the value of said control signal with a predetermined value corresponding to a particular light source, according to the result of discrimination by said discrimination means.

5. A video camera according to claim 1, further comprising:
   fixation means for fixing the value of said control signal according to the result of discrimination by said discrimination means.

6. A video camera according to claim 1, further comprising:
   timer means for measuring the time from the start of function of said control signal forming means;
   wherein said termination means is adapted to terminate the function of said control signal forming means, according to the output of said timer means.

7. A video camera according to claim 1, wherein said control signal forming means is adapted to form said control signal according to said plural color signals formed by said image pickup means.

8. A video camera according to claim 7, wherein said control signal forming means is adapted to form said control signal, utilizing the plural color signals transmitted by said regulation means.

9. A video camera according to claim 8, wherein said control signal forming means includes plural integration circuits for respectively integrating plural color signals transmitted by said regulation means.

10. A video camera, comprising:
    a) image pickup means for forming plural color signals according to the light from an object;
    b) plural regulation means for respectively regulating the gains of said plural color signals;
    c) control signal forming means for forming plural control signals for controlling said plural regulation means, utilizing said plural color signals;
    d) discrimination means for discriminating whether the combination of said plural control signals belong to a predetermined group of combinations; and
    e) control means for substituting the values of said plural control signals with other values and stopping the function of said control signal forming means, in response to the result of discrimination by said discrimination means, said control means subsequently inhibiting the function of said control signal forming means irrespective of said control signal.

11. A video camera according to claim 10, wherein said control means is adapted to substitute the combination of said plural control signals with a combination belonging to said group and close to the first-mentioned combination, according to the result of discrimination by said discrimination means.

12. A video camera according to claim 10, wherein said control means is adapted to substitute the combination of said plural control signals with a predetermined combination corresponding to a predetermined light source, according to the result of discrimination by said discrimination means.

13. A video camera, comprising:
    a) image pickup means for forming plural color signals according to the light from an object;
    b) regulation means for relative regulation of the gains of said plural color signals thereby regulating the white balance thereof;
    c) control signal forming means for forming, according to color temperature information, a control signal for controlling said regulation means;
    d) discrimination means for detecting that the color of said object has a deviation to a particular color; and
    e) substitution means for substituting the value of the control signal formed by said forming means with another value, in response to the result of detection by said detection means, and for subsequently maintaining the another value irrespective of said control signal.

14. A video camera according to claim 13, wherein said substitution means is adapted to substitute the value of said control signal, formed by said forming means with a predetermined value corresponding to a predetermined light source, according to the result of detection by said detection means.

15. A video camera according to claim 13, wherein said substitution means includes a memory for storing the value of the control signal formed by said forming means, and is adapted to substitute the value of the control signal, formed by said forming means, with a past value of the control signal stored in said memory.

16. A video camera according to claim 13, wherein said detection means includes plural integration circuits for respectively integrating said plural color signals formed by said image pickup means.

17. A video camera according to claim 13, wherein said detection means includes plural integration circuits for respectively integrating plural color signals transmitted by said regulation means, and plural comparator circuits for respectively comparing the outputs of said plural integration circuits with predetermined values.

18. A video camera according to claim 13, wherein said control signal forming means is adapted to form said control signal according to said plural color signals formed by said image pickup means.

19. A video camera according to claim 18, wherein said control signal forming means is adapted to form said control signal, utilizing plural color signals transmitted by said regulation means.

20. A video camera according to claim 19, wherein said control signal forming means includes plural integration circuits for respectively integrating plural color signals transmitted by said regulation means.